United States Patent [19]
Dobler et al.

[11] Patent Number: 4,890,498
[45] Date of Patent: Jan. 2, 1990

[54] PRESSURE SENSOR

[75] Inventors: Klaus Dobler, Gerlingen; Jürgen Wendel, Stuttgart, both of Fed. Rep. of Germany

[73] Assignee: Robert Bosch GmbH, Stuttgart, Fed. Rep. of Germany

[21] Appl. No.: 271,754

[22] PCT Filed: Mar. 5, 1987

[86] PCT No.: PCT/DE87/00093
§ 371 Date: Sep. 14, 1988
§ 102(e) Date: Sep. 14, 1988

[87] PCT Pub. No.: WO87/05997
PCT Pub. Date: Oct. 8, 1987

[30] Foreign Application Priority Data

Mar. 27, 1986 [DE] Fed. Rep. of Germany ....... 3610351

[51] Int. Cl.$^4$ ............................ G01L 7/08; G01L 9/06
[52] U.S. Cl. .................................... 73/727; 73/754; 338/4
[58] Field of Search .................. 73/DIG. 4, 720, 721, 73/726, 727, 754, 753; 338/4, 42

[56] References Cited

U.S. PATENT DOCUMENTS

| | | | |
|---|---|---|---|
| 3,031,591 | 4/1962 | Cary et al. | 73/DIG. 4 |
| 3,082,334 | 3/1963 | Riesen | 73/754 |
| 4,519,254 | 5/1985 | Sondergger et al. | 73/726 |

Primary Examiner—Donald O. Woodiel
Attorney, Agent, or Firm—Michael J. Striker

[57] ABSTRACT

A pressure sensor includes a housing having a hollow space in the form of a longitudinal bore hole with a portion having a greater diameter on the end facing the pressure medium. A pressure-sensitive element is placed into this end portion of the longitudinal bore hole and a closing member is pressed into the bore hole and closes the hole so as to be tight. Accordingly, the remaining portion of the longitudinal bore hole need only have a small diameter corresponding to the electrical conductors which extend from the pressure-sensitive element. The strength of the housing is therefore considerably increased.

9 Claims, 2 Drawing Sheets

PRESSURE SENSOR

BACKGROUND OF THE INVENTION

This invention relates to pressure sensors and more particularly to an improved pressure sensor which is easy to assemble and has improved strength. In a known pressure sensor, the pressure-sensitive element is inserted in a pocket bore hole and pressed against the base of the pocket bore hole by a holding part. For this purpose, a relatively large bore hole diameter is necessary so as to be able to insert the pressure-sensitive element. The strength of the pressure sensor is accordingly decreased. In particular, the strength of the wall of the pressure sensor may not be sufficient when this sensor is used for a longer period or at extremely high pressures.

SUMMARY OF THE INVENTION

The invention is directed to a pressure sensor for detecting the pressure of a medium comprising, in combination: a pressure-sensitive element having electrical properties which change under the influence of pressure, a housing for supporting the pressure-sensitive element, the housing having a hollow space in the form of a continuous bore hole, a closing member for sealing the continuous bore hole relative to the medium whose pressure is to be determined, the closing member having an inner side which contacts the pressure sensitive element in such a way that mechanical stress is produced at the pressure-sensitive element, and electrical conductors extending through the hollow space for carrying electrical signals from the pressure sensitive element.

A pressure sensor according to the invention has the advantage in that the housing has a smaller bore hole diameter; it need only correspond to the thickness of the electrical conductors. The pressure-sensitive element is slid into a recess of the housing from the side of the pressure medium, so that a larger bore hole diameter is needed only in the area of the pressure-sensitive element. Since the bore hole is closed by means of a closing member, against which the pressure-sensitive element rests, good pressure transmission from the pressure medium to the pressure-sensitive element is ensured. At the same time, the pressure-sensitive element is separated from the pressure medium, as in an arrangement in a pocket bore hole. The strength of the pressure sensor is considerably improved.

Advantageous developments of the pressure sensor of the invention are possible which simplify its assembly. In particular, strip conductors can be printed on a carrier in a simple manner, and the respective measurement signals are derived in this way from the pressure-sensitive element.

BRIEF DESCRIPTION OF THE DRAWING

The invention will now be described in greater detail with particular reference to the accompanying drawing wherein.

DESCRIPTION OF THE PREFERRED EMBODIMENTS

Figure 1:
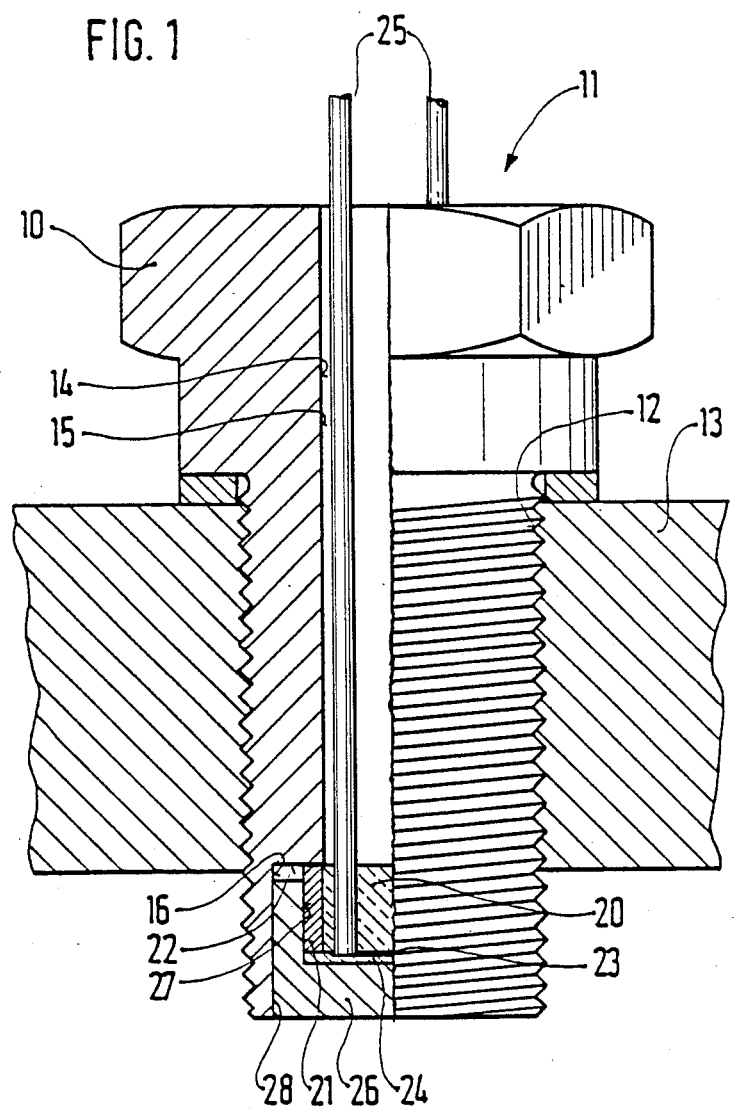
FIG. 1 is an elevational sectional view of a pressure sensor according to the invention.

In FIG. 1, the housing of a pressure sensor 11, which is constructed as a screw or in the shape of a screw, is designated by the reference numeral 10. The housing 10 is inserted in a bore hole 12 of the wall 13 of a pressure vessel and can project over the wall 13 into the pressure medium, whose pressure or variation in pressure, respectively, is to be measured. The housing 10 comprises an approximately central, continuous, stepped longitudinal bore hole 14 comprising portions 15 and 16. The portion 16 with the greatest diameter faces the interior of the pressure vessel, i.e. the pressure medium.

An insulating member 20 (e.g. glass), which is enclosed by a metal ring 21, is located in the portion 16 of the longitudinal bore hole 14. The metal ring 21 rests at the shoulder 22 formed between the portions 15, 16 of the longitudinal bore hole 14 and is at a distance radially from the wall of the portion 16. A pressure-sensitive element 23, which is adjoined by a disk 24, is arranged on the front side of the insulating member 20 facing the pressure medium. The disk 24 comprises resilient, pressure transmitting material and ends at its outer circumference so as to be flush with the metal ring 21. Electrical leads 25 extend in an outward direction from the pressure-sensitive element 23 through the insulating member 20 and the longitudinal bore hole 14. The longitudinal bore hole 14 is closed by a cup-shaped closing member 26 from the side of the pressure medium. The metal ring 21 and the disk 24 are located in the recess 27 of the closing member 26. The closing member 26 is inserted in the portion 16 of the longitudinal bore hole 14 in a press fit. However, it is also conceivable to screw the closing member 26 into the portion 16. In both cases, the closing member 26 ends so as to be flush with the housing 10. At the same time, it is necessary that the disk 24 rest at the base of the closing member 26 and the metal ring 21 is pressed against the shoulder 22, which serves as a counterforce. Thus, a pressure transmission to the pressure-sensitive element 23 is possible. For the purpose of additionally securing and sealing, the closing member 26 can be welded or cemented along the separating line 28 between the portion 16 and the closing member 26. Accordingly, after inserting the closing member 26, a pocket bore hole with the known advantages occurs again, but with a greatly reduced diameter in the upper area.

During the production of the pressure sensor 11, the insulating member 20 with the metal ring 21, pressure-sensitive element 23 and the disk 24 is first slid into the longitudinal bore hole 14 from the side of the pressure medium. Accordingly, in the portion 15, the longitudinal bore hole 14 need only have the diameter of the two electrical leads 25. The closing member 26 is then pressed into the portion 16 until the disk 24 rests at the base of the closing member 26 and the metal ring 21 simultaneously rests at the shoulder 22. The pressure-sensitive element 23 is accordingly also pressed against the base of the closing member 26. The separating line 28 can now be welded. In order to obtain a flush closure between the housing 10 and the closing member 26, the front side of the housing 10 which faces the pressure medium can be ground and polished, respectively. The longitudinal bore hole 14 accordingly forms a pocket bore hole. But this results in the additional advantages that only a diameter of the longitudinal bore hole 14 adapted to the leads 25 is needed and the strength of the pressure sensor in the screw-in area is accordingly substantially improved.

Figure 2:
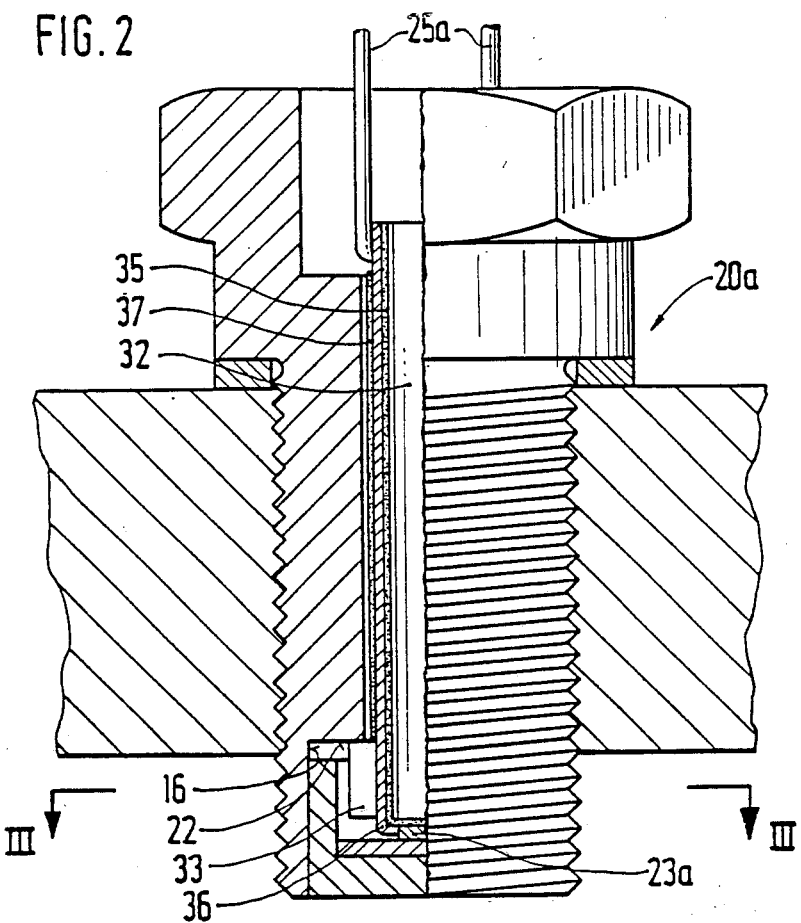
FIG. 2 is a similar view of a modification of the pressure sensor shown in FIG. 1.
Figure 3:
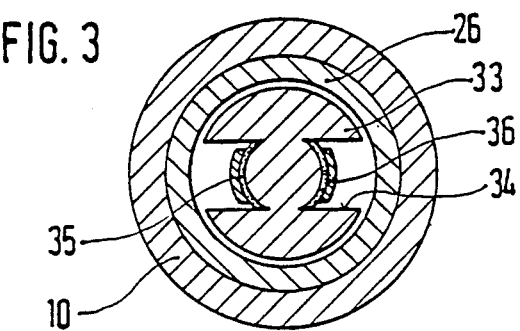
FIG. 3 is a sectional view taken along the line III—III in FIG. 2.

FIG. 2 shows another embodiment of a pressure sensor 20a according to the invention wherein the electrical leads 25 are replaced by conductor strips 36. Corresponding structural component parts are designated by the same reference numbers as before. A metallic carrier 32, which has a portion 33 with a greater diameter in the area of the portion 16 and rests against the shoulder 22, when this this portion 33 is inserted in the longitudinal bore hole 14. In addition, two longitudinal grooves 34, which extend parallel to the longitudinal axis, are constructed in the carrier 32—as can be seen in more detail in FIG. 3. An insulating layer 35, e.g. glass, is applied to the carrier 32 in the longitudinal grooves 34 and on the front side. Conductor strips 36 are printed on the insulating layer 35 and a pressure-sensitive element 23a is printed on the front side. The latter can be constructed by thin-film techniques, as well as thick-film techniques, and can work e.g. according to the piezoresistive or piezoelectric effect. In the area of the portion 15 of the longitudinal bore hole 14, the conductor strips 36 are additionally covered by means of an insulating layer 37 or by means of an insulating tube in order in this way to prevent a contact with the housing 10. Electrical leads 25a extend from the conductor strips 36 to an evaluating circuit, which is not shown. Of course, the leads 25a can also already be arranged in the area of the portion 16 at the conductor strips 36, so that no additional insulating layer 37 would be necessary.

A pressure sensor according to the invention can be advantageously employed in the measurement of pressure in distributor pumps of fuel injection systems, as well as in combustion pressure measurement in diesel or gasoline engines.

We claim:

1. Pressure sensor for detecting the pressure of a medium defined by a wall comprising, in combination:
    a pressure-sensitive film resistor which changes its electrical properties under the influence of pressure;
    a housing for supporting said pressure-sensitive film resistor, said housing having a hollow space which is formed by a continuous bore hole;
    a closing member sealing said continuous bore hole relative to the medium whose pressure is to be determined, said closing member having an inner side which contacts said film resistor in such a way that mechanical stress is produced at said film resistor; and
    at least one electrical conductor extending through said hollow space for carrying electrical signals from said pressure-sensitive film resistor.

2. Pressure sensor according to claim 1, wherein said closing member is connected with the wall of said continuous bore hole so as to be fixed mechanically.

3. Pressure sensor according to claim 2, wherein said closing member is screwed into said continuous bore hole.

4. Pressure sensor according to claim 2, wherein said closing member is inserted into said continuous bore hole by means of a press fit.

5. Pressure sensor according to claim 4, wherein the separating line between said continuous bore hole and said closing member is welded or cemented.

6. Pressure sensor according to claim 1, wherein said continuous bore hole comprises a first and a second portion, said first portion having a greater diameter than said second portion and containing said pressure-sensitive film resistor and said closing member, and wherein said second portion has a diameter no greater than that required to accommodate said electrical conductors.

7. Pressure sensor according to claim 6, further including a carrier having a first portion and a second portion, said second portion having a lesser diameter than said first portion and containing an insulating layer, conductor strips and said pressure-sensitive film resistor, said film resistor being printed or evaporated onto said insulating layer.

8. Pressure sensor according to claim 1, wherein said pressure sensitive film resistor is a thick-film resistor.

9. Pressure sensor according to claim 1, wherein said pressure sensitive film resistor is a thin-film resistor.

* * * * *